W. G. JIBBEN.
MARKER FOR CORN PLANTERS.
APPLICATION FILED APR. 8, 1916.
1,207,557. Patented Dec. 5, 1916.
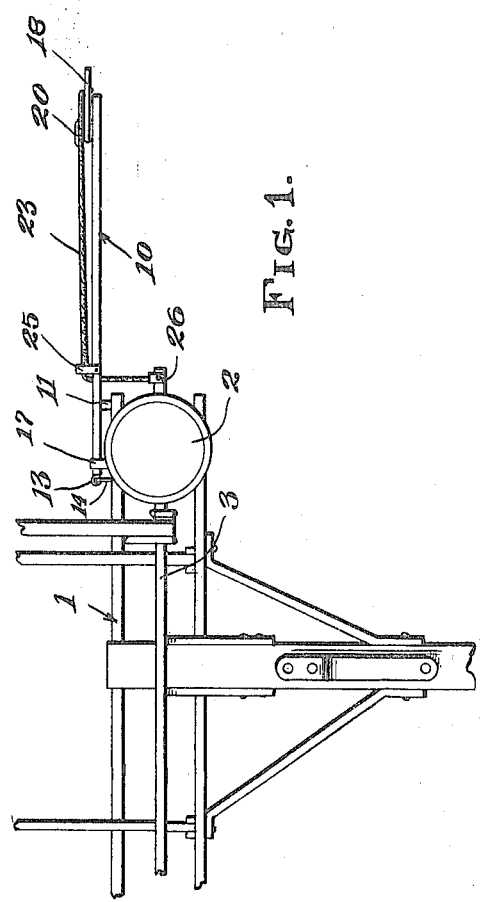
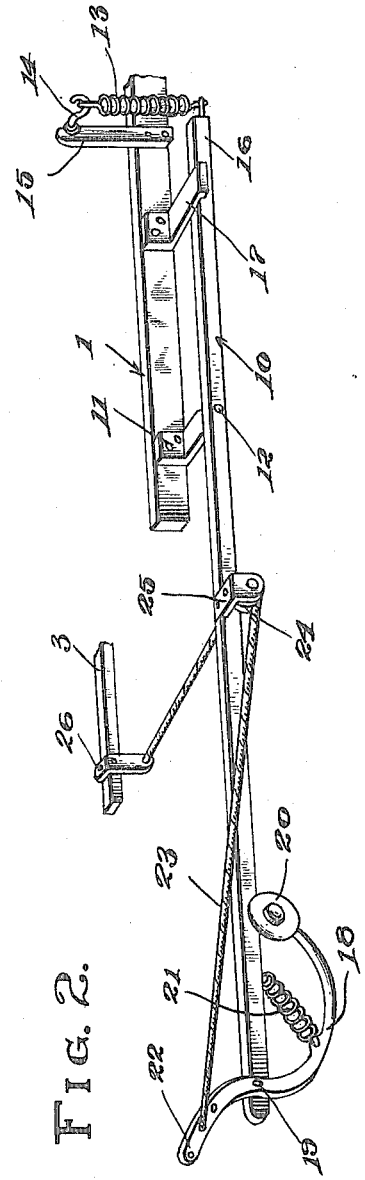
Witnesses
H. F. Keith
Roh? Meyer.
Inventor
W. G. JIBBEN.
By _____ Jr.
Attorney

UNITED STATES PATENT OFFICE.

WILLIAM G. JIBBEN, OF BRUCE, SOUTH DAKOTA.

MARKER FOR CORN-PLANTERS.

1,207,557.  Specification of Letters Patent.  Patented Dec. 5, 1916.

Application filed April 8, 1916. Serial No. 89,802.

*To all whom it may concern:*

Be it known that I, WILLIAM G. JIBBEN, a citizen of the United States, residing at Bruce, in the county of Turner and State of South Dakota, have invented certain new and useful Improvements in Markers for Corn-Planters; and I do hereby declare the following to be a full, clear, and exact description of the invention, such as will enable others skilled in the art to which it appertains to make and use the same.

This invention relates to a marker for use upon corn planters, and more particularly to a marker which is adapted for use upon the corn planter structure disclosed in the application for Letters Patent filed July 18, 1914, serial number 851,752.

The primary object of the invention is to provide a marker structure which includes a pivotally mounted arm having a second substantially S-shaped arm pivotally connected to its outer end, upon the lower end of which S-shaped arm is mounted a marking or gouging disk which is adapted for movement into the ground for making a mark, and further to provide means for moving the substantially S-shaped bar pivotally upon each operation of the seed dispensing mechanism.

With the foregoing and other objects in view this invention consists in such novel features of construction, combination and arrangement of parts as will be hereinafter more fully described, illustrated in the accompanying drawing and claimed.

In describing the invention in detail reference will be had to the accompanying drawings wherein like characters designate like and corresponding parts throughout the several views, and in which:—

Figure 1 is a plan view of the improved marker showing the same applied to a fragment of a corn planter, and Fig. 2 is a perspective view of the improved marker.

Referring more particularly to the drawings, 1 designates a part of the supporting frame of a corn planter, which has the usual type of seed dispensing structure carried thereby, and the seed dispensing structure operating shaft 3. The frame 1 of the corn planter has a marker bar 10 pivotally connected thereto through the medium of a bracket 11 and a pin 12. The marker bar 10 has a spiral spring 13 connected to its rear end, which spiral spring is also secured to a hook 14. The hook 14 is supported by a vertical arm 15 which is secured to the corn planter frame in any suitable manner. The spring 13 tends to hold the end 16 of the marker bar 10 in an upward position at all times, and also returns it to its normal position after the marker bar has been operated for designating the position of the planting of a hill of corn. A suitable bracket 17 is carried by the frame 1 and limits the upward movement of the end 16 of the marker bar 10. The marker bar 10 has an arcuate substantially S-shaped arm 18 pivotally connected to its outer end as is shown at 19, which substantially S-shaped arm has a marking roller or disk 20 mounted upon one of its ends, which is normally positioned beneath the bar 10. The substantially S-shaped arm 18 is connected to the marker bar 10 by a spiral spring 21, which spring holds the roller 20 in an upward position and out of engagement with the ground over which the corn planter is passing. The upper end 22 of the substantially S-shaped arm 18 has a flexible member 23 connected thereto which passes about a roller 24. The roller 24 is carried by a suitable bracket 25 which is attached to the marker bar 10. The flexible member 23 extends about the roller 24 and is connected to an angled arm 26 which is attached to the speed dispensing mechanism operating shaft 3 so that upon rotation of the shaft 3 the flexible member 23 will be drawn in the direction indicated by the arrow A in Fig. 2 of the drawing, for moving the arcuate or S-shaped arm 18 on its pivotal support 19 which will cause the roller 20 to move into engagement with the ground and leave a distinct designating mark thereupon which shows the position of each of the hills of corn as they are planted. The pivotal mounting of the marker bar 10, and the provision of the spring 13 will permit of a limited yieldable movement of the marker bar during its operation.

In reducing the invention to practice, certain minor features of construction, combination and arrangement of parts may necessitate alterations to which the patentee is entitled provided such alterations are comprehended within the scope of what is claimed.

What is claimed is:—

1. In a marker bar structure for attachment to corn planters, a pivotally mounted marker bar, yieldable means connected to one end of said marker bar for permitting of a limited downward movement of the end, a substantially S-shaped bar pivotally connected to the outer end of said marker bar remote from said yieldable means, a marking disk carried by one end of said substantially S-shaped bar, and a spiral spring connecting said S-shaped bar to said marker bar.

2. In a marker bar structure for attachment to corn planters, a pivotally mounted marker bar, yieldable means connected to one end of said marker bar for permitting of a limited downward movement of the end, a substantially S-shaped bar pivotally connected to the outer end of said marker bar remote from said yieldable means, a marking disk carried by one end of said substantially S-shaped bar, and a spiral spring connecting said S-shaped bar to said marker bar, a flexible member connected to the end of said substantially S-shaped bar remote from said disk, said flexible means adapted for connection with the seed dispensing shaft of an ordinary corn planter for pivotally moving the S-shaped bar upon operation of the seed dispensing shaft.

3. The combination with a corn planter structure including a seed dispensing mechanism operating shaft, and a supporting frame, of a marker arm pivotally connected to said supporting frame, yieldable means connected to said frame and to one end of said marker bar for permitting of a limited pivotal movement of the marker bar, a substantially S-shaped arm pivotally connected to the end of said marker arm remote from said yieldable means, a marker disk mounted upon one end of said substantially S-shaped arm, a flexible member connected to said substantially S-shaped bar and to said operating shaft for moving said S-shaped arm pivotally upon operation of said shaft for causing said disk to make a mark in the ground, and a spring connected to said S-shaped bar and said marker bar for automatically returning said S-shaped bar into an inoperative position.

4. The combination with a corn planter structure including a seed dispensing mechanism operating shaft, and a supporting frame, of a marker arm pivotally connected to said supporting frame, yieldable means connected to said frame and to one end of said marker bar for permitting of a limited pivotal movement of the marker bar, a substantially S-shaped arm pivotally connected to the end of said marker arm remote from said yieldable means, a marker disk mounted upon one end of said substantially S-shaped arm, a flexible member connected to said substantially S-shaped bar and to said operating shaft for moving said S-shaped arm pivotally upon operation of said shaft for causing said disk to make a mark in the ground, and a spring connected to said S-shaped bar and said marker bar for automatically returning said S-shaped bar into an inoperative position, and a bracket carried by said corn planter frame and adapted for limiting the upward pivotal movement of the end of said marker bar to which said yieldable means is connected.

In testimony whereof I affix my signature in presence of two witnesses.

WILLIAM G. JIBBEN.

Witnesses:
R. A. TOWNSEND,
P. E. CLEMENS.

Copies of this patent may be obtained for five cents each, by addressing the "Commissioner of Patents, Washington, D. C."